Oct. 7, 1958  W. N. GEIGER  2,854,773
MOUNT-HOLDING CARRIAGE FOR PROJECTION MACHINES
Filed July 27, 1956  2 Sheets-Sheet 2
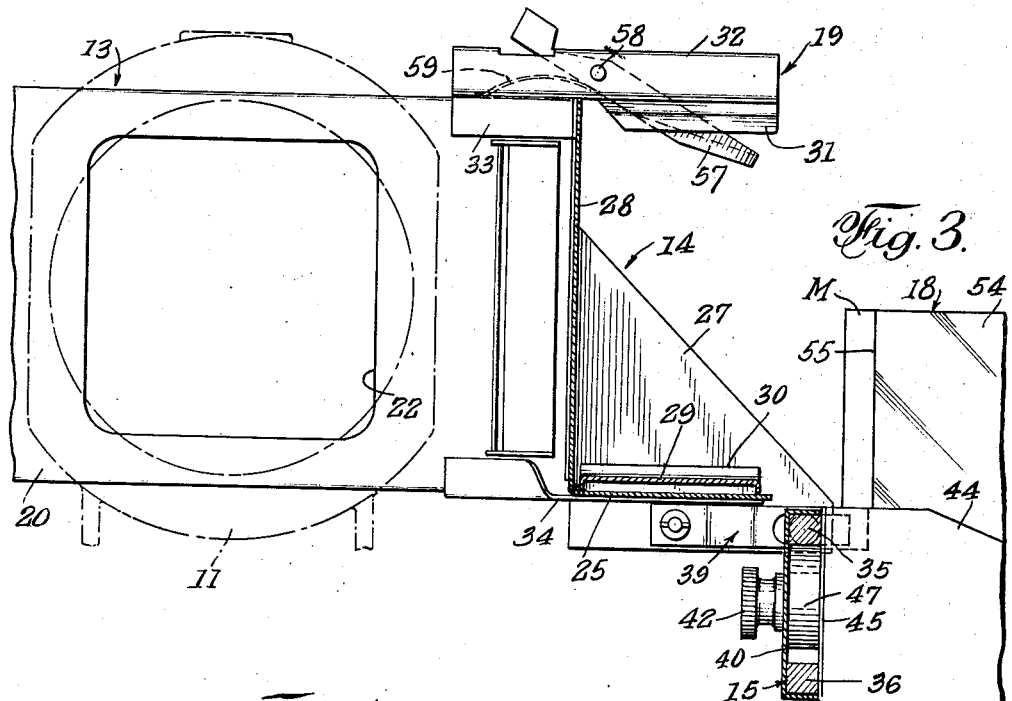
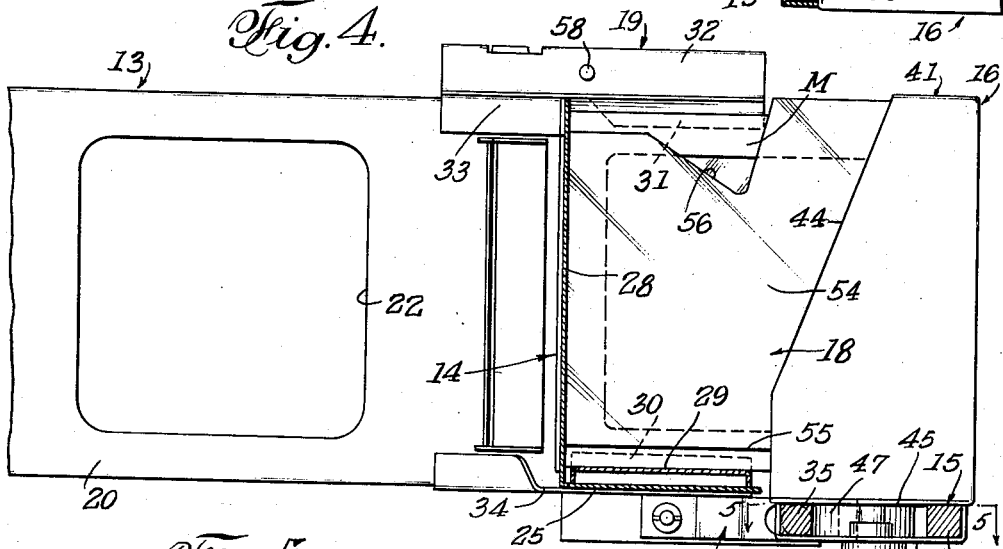
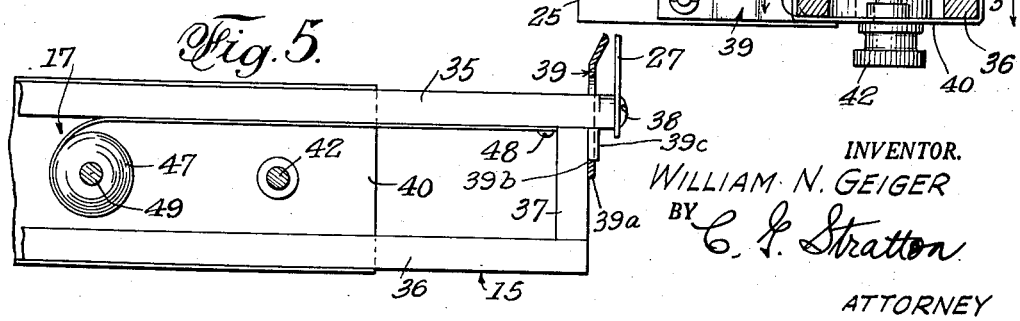
INVENTOR.
WILLIAM N. GEIGER
BY C. L. Stratton
ATTORNEY United States Patent Office 2,854,773
Patented Oct. 7, 1958

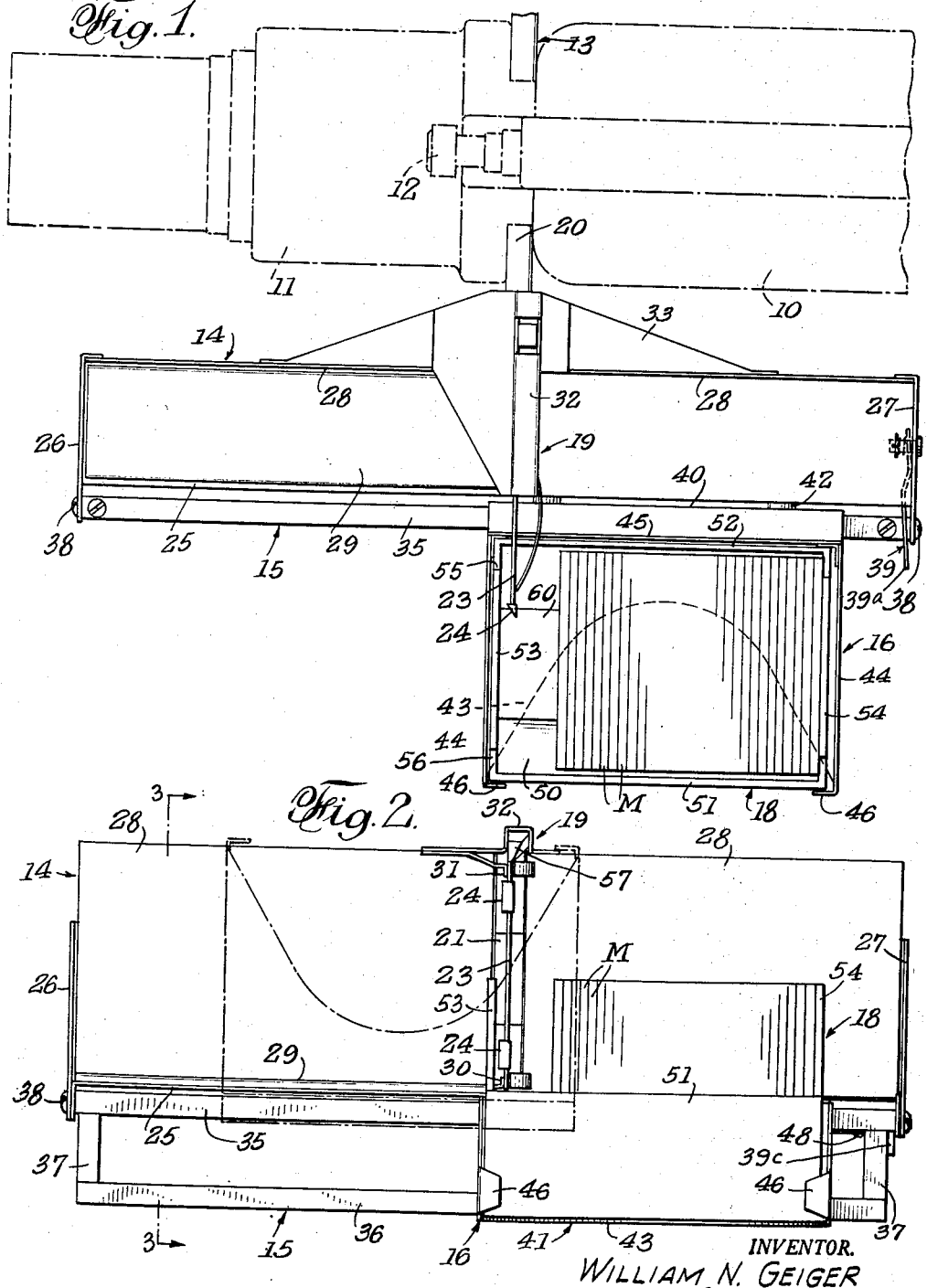

2,854,773

MOUNT-HOLDING CARRIAGE FOR PROJECTION MACHINES

William N. Geiger, Glendale, Calif.

Application July 27, 1956, Serial No. 600,438

11 Claims. (Cl. 40—79)

This invention relates to a carriage for holding transparencies or mounts in position to be successively placed in projection position in a projector.

The present invention combines three components that cooperate to provide a mechanism that greatly facilitates loading of transparencies or mounts, thereby enabling facile handling, even in the dark, and providing for positive and fool-proof operation. These components are, generally, a carriage slide embodying a carrier, a tray or container for a plurality of mounts, and a tray-holding carriage carried by the slide carrier and adjustable between a loading position and an operative position wherein the mounts may be successively moved into and out of projection position.

Another object of the invention is to provide a mechanism of the character referred to in which loading of mounts is rendered simple in that the tray receiving such mounts may be loaded before assembly and placing of the tray in the holder and the tray-provided holder in operative position are rendered sure and facile.

A further object of the invention is to provide a mount-holding means that operates automatically, as the successive mounts are projected to move toward initial loading position for ready replacement of the complement of mounts in the tray of said means.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangement of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a plan view of a mount-holding carriage embodying the present improvements and shown in loading position.

Fig. 2 is a front, elevational view thereof.

Fig. 3 is an enlarged cross-sectional view as taken on line 3—3 of Fig. 2, parts being broken away.

Fig. 4 is a similar view in mount-feeding position.

Fig. 5 is a broken horizontal sectional view as taken on line 5—5 of Fig. 4.

Figs. 1 and 3 show portions of a conventional projection machine on which the present carriage is adapted to be mounted. Said machine is shown as comprising a lamp housing 10 and an optical unit 11 that forms a forward extension of said housing and projects the light provided within said housing. A clamp or lock screw 12 separably connects the unit 11 and the housing 10, the present mechanism being adapted to be clamped therebetween.

The mount-holding carriage that is illustrated comprises, generally, a mounting unit 13 in which mounts M are adapted to be positioned so that the picture thereof may be successively projected through unit 11 onto a wall or screen, a carriage slide 14 affixed to the mounting unit 13 in transverse relationship to be positioned alongside the projection machine when unit 13 is clamped in operative position, a carrier 15 adjustably mounted on the slide 14 and generally coextensive longitudinally with said slide, a carriage 16 mounted on the carrier 15 and slidable therealong, means 17 resiliently biasing the carriage in one direction, a mount-holding tray or container 18 for a complement of mounts M, and means 19 to separate the mounts to be fed to projection position from those returned by the mounting unit 13 to the tray 18.

The mounting unit 13, per se, forms no part of the present invention, the same constituting a means for effecting successive feed of mounts so the latter are placed in projection position. In this instance, the unit 13 comprises a channel assembly 20 that is formed to have a channel or passage 21 into which a mount M may be moved so as to be positioned in register with aperture 22 provided in the channel assembly. As seen in Fig. 3, this aperture is concentric with the optical unit 11. Hence light from housing 10 will pass through such mount and be projected by unit 11.

The mounting unit 13 is shown as provided with a reciprocating mount-feeding plate 23 that is provided with feed dogs 24, reciprocative movement of said plate enabling said dogs to move a mount M to projection position.

The carriage slide 14 comprises a horizontal bottom plate 25 that extends between end walls 26 and 27, a vertical back wall 28 that has a space into which passage 21 opens, and a mount-locating slide plate 29 carried by bottom plate 25 between the end wall 26 and the approximate middle of the passage 21, as may be seen from Fig. 2. The end 30 of said plate 29 is upwardly bent to constitute a limiting stop for the mounts and also a guide for the feed plate 23. A cooperating stop 31 is provided at the upper end of the mechanism, the same being carried by an upper hood 32. Upper and lower braces 33 and 34 connect the mounting unit 13 and the carriage slide 14 so that the latter is rigidly disposed alongside the projector when the former is clamped as above described.

The carrier 15 is carried by and between the end walls 26 and 27 forward of and below the plate 25. Said carrier frame 15 is shown as a rectangular frame comprised of horizontal bars 35 and 36 that are connected at their end by bars 37. Said frame is mounted on the walls 26 and 27 as by means of pivot screws 38 that engage the ends of bar 35. Thus formed, the carrier 15 is adapted to have a pendent position, as in Figs. 1, 2 and 3, and a forwardly-extending position, as in Figs. 4 and 5. A latch 39 is provided for selectively holding said carrier in either of the mentioned positions so that the same becomes a rigid part of the carriage slide. Said latch is here shown as a spring-biased member 39a that has an aperture 39b of such form as to receive a lug 39c in the carrier 15 when the latter is forwardly extended. As can be seen in Fig. 5, the latching engagement of said lug 39c and latch member 39 holds the frame 15 in the horizontal position above indicated.

The carriage 16 is shown as a channel plate 40, that is slidingly engaged with the bars 35 and 36 of the carrier frame 15 and a tray holder 41 affixed to said plate 40, as by bolts or screws 42. Said holder 41 constitutes a receptacle that has a bottom wall 43, end walls 44 and a back wall 45 that is engaged by screws 42. With the carrier frame 15 pendent, said holder 41 is top open and is adapted to receive the tray 18, the latter being retained in position by forwardly disposed flanges 46 provided on the walls 44.

The above-described carriage is biased toward the right by the means 17 which is best seen in Fig. 5 and comprises a spirally coiled spring 47 that is connected at one end 48 to the carrier frame 15 and at its opposite end to a stud 49 carried by the carriage, preferably between the two screws 42. The tension of spring 47 is increased as the carriage is moved to the left, thereby increasing the force biasing the carriage toward the right.

The mount-holding tray 18 is preferably formed of a transparent plastic material and is of rectangular form so as to hold a complement of mounts M. Said tray has a bottom wall 50, similar front and back walls 51 and 52, and similar end walls 53 and 54. Said walls 53 and 54 are higher than are the front and back walls, being substantially the same height as the mounts, as can be seen from Fig. 2. Each wall 53 and 54 is notched at 55 to clear the lower stop 30 when the tray is in mount-feeding position, and at 56 to clear both stop 31 and an arm 57 the mount-separating means 19.

Said separating means is shown as said arm 57, carried on a pivot 58 by the hood 32, and biased by a spring 59 to move into the path of mounts in tray 18 to separate those on one side from those on the opposite side. Said arm is held elevated by the upper edge of feed plate 23 (see Fig. 2) and automatically falls to separating position when said feed plate is withdrawn to feed a mount into the projector.

Figs. 1, 2 and 3 show the loading position of the present device. It is understood that plate 23 is withdrawn to enable placing of a mount-loaded tray into carriage 16. From this position, the carriage is shifted to the left against the force of spring 47 so that the right tray wall 54 is to the left of the depending arm 57. Now, the latch 39 is released to free the carrier frame 15 and the latter is swung through an arc of 90° to bring the initially rearward edges of the mounts M in resting position on slide plate 29 and wall 52, as can be seen in Fig. 4. In this position, latch 39 re-engages to lock the carrier frame 15 in its forwardly extended position.

When the carriage 16 is released, the biasing force of spring 47 pulls said carriage toward the right. Since the notches 55 and 56 of tray wall 54 enables said wall to clear arm 57 and stops 30 and 31, the movement of the carriage toward the right is arrested by engagement of the stack of mounts M with said stops. The rightmost mount is the one that is so engaged. Said latter mount will be in register with the passage 21 of the mounting channel 20.

By projecting feed plate 23, the dogs 24 thereof hook behind the edge of said rightmost mount that is engaged with the tray bottom 50, said edge being upright during the feeding of the mounts by said dogs. To enable such hooking engagement, the tray bottom 50 is provided with a thickened portion or land 60 that serves to space said edge away from the tray bottom. Now, by retracting plate 23 into passage 21, said rightmost mount is drawn into said passage and brought into register with aperture 22 of the channel assembly 20, by the pull of spring 47 biasing the carriage 16 to the right. Since the arm 57 is released by the retracting plate 23, the same falls under bias of spring 59 to the position of Fig. 3 in the path of the rightmost mount remaining in the tray 18.

This feed mechanism embodies a means for returning a mount previously moved to projection position, back into the tray and on the right side of the arm 57, when said plate 23 is reprojected to hook onto the next mount to be fed to the projector. Said arm 57 serves as a separator between the stack of mounts to be fed and those returned after feeding, when the plate 23 is retracted.

As hereinbefore indicated the particular means 20 for feeding mounts from tray 18 for projection and returning them to the tray forms no part of the present invention, the same being disclosed in my co-pending application, Serial No. 600,439.

After all of the mounts have been fed to the projector, the carriage 16 will be released so that the spring 47 may move the same fully to the right of passage 21. By releasing latch 39, the carriage may be swung down to its initial loading position enabling ready removal of tray 18 and the mounts therein and, if desired, ready replacement with another mount-loaded tray.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. Mount-holding means comprising a carriage slide, means adapted to support said slide in horizontal position alongside of a projection machine, said support means having a mount-receiving passage opening onto said carriage slide intermediate its ends, a carrier adjustably carried by the slide, a carriage longitudinally movable along said carrier and, upon adjustment of the carrier to be selectively positioned either outwardly and forwardly of the slide or upwardly and forwardly of said slide, means resiliently biasing the carriage toward an end of the slide at one side of the passage opening, a mount-holding tray adapted to be carried by said carriage, and stop means on the slide to engage a mount in said tray when the carriage is in said upward and forward position and when the carriage is moved to the portion of the slide at the other side of said passage opening to align the same with the mentioned passage opening.

2. Mount-holding means according to claim 1 in which the adjustment of the carrier is pivotal and the carrier is mounted between the ends of the slide.

3. Mount-holding means according to claim 1, the carrier comprising a hinged frame mounted between the end of the slide and a latch is provided to releasably hold said frame in the mentioned positions of adjustment.

4. Mount-holding means according to claim 1 in which the carrier in its outward and forward position, is provided with means to hold the tray with the mounts therein supported by the bottom of the tray, and the carrier being provided with means which, when the same is in its upward and forward position, holds the tray with the mounts therein supported by the carriage slide.

5. Mount-holding means according to claim 1 in which the carrier in its outward and forward position, holds the tray with the mounts therein supported by the bottom of the tray, and the carrier, in its upward and forward position holds the tray with the mounts therein supported by the carriage slide, said slide being provided with a slide plate upon which rest the edges of the mounts that are at right angles to the edges thereof engaged with the tray bottom.

6. Mount-holding means comprising a carriage slide having an intermediate opening, a pivotally and slidably mounted mount-holding carriage carried by said slide, means biasing said carriage to a position at one side of the mentioned opening, and stop means engaged with a mount in register with said opening and resisting the biasing means to hold the mounts at the other side of said opening.

7. Mount-holding means according to claim 6 in which the carriage is provided with a removable tray and said mounts are positioned in and removable together with the tray.

8. Mount-holding means according to claim 6 in which the carriage is provided with a removable tray and said mounts are positoned in and removable together with the tray, said tray having end walls between which the mounts are disposed and said walls are provided with notch to clear the mentioned stops.

9. Mount-holding means according to claim 6 in which the slide is provided with a pivoted carrier and said carrier mounts the carriage.

10. In a device of the character described, means to move a complement of mounts between a loading position and a position from which the same are fed to a projection machine, said means comprising a carriage for holding said mounts, a carrier frame along which said carriage is longitudinally slidable, means biasing said carriage in a direction toward its loading position, a slide, and means pivotally mounting the carrier on the slide so that the carriage frame on the carrier may be moved between said loading position and a position superposed on the slide and from which fed.

11. In a device according to claim 10, said slide being provided with stops to engage a mount and align the same with the mentioned feed position.

References Cited in the file of this patent

UNITED STATES PATENTS

| | | |
|---|---|---|
| 998,305 | Roebuck | July 18, 1911 |
| 2,513,102 | Parlini et al. | June 27, 1950 |
| 2,583,442 | Parlini et al. | Jan. 22, 1952 |